United States Patent [19]
Selbach et al.

[11] Patent Number: 5,941,185
[45] Date of Patent: Aug. 24, 1999

[54] OPTICAL FILAMENT INSERTION APPARATUS

[75] Inventors: Herbert Selbach, Park Rige, N.J.; Holger Neef, Ittlingen, Germany

[73] Assignee: Selbach Machinery L.L.C., Park Ridge, N.J.

[21] Appl. No.: 08/922,148

[22] Filed: Aug. 25, 1997

[51] Int. Cl.$^6$ .................................................. D05C 15/28
[52] U.S. Cl. .................... 112/80.16; 112/80.23; 112/80.3; 112/470.06; 112/475.23; 156/93; 362/32
[58] Field of Search ............... 112/80.16, 80.23, 112/80.3, 80.31, 80.01, 80.7, 80.71, 475.01, 470.06, 470.09, 102.5, 475.23; 362/103, 32, 252, 806; 156/93, 275.5, 379.8

[56] References Cited

U.S. PATENT DOCUMENTS

| | | | |
|---|---|---|---|
| 4,453,477 | 6/1984 | Gerber | 112/80.23 X |
| 4,597,344 | 7/1986 | Stutznacker | 112/80.31 |
| 4,854,250 | 8/1989 | Stuvecke et al. | |
| 4,875,144 | 10/1989 | Wainwright | |
| 5,738,753 | 4/1998 | Schwar et al. | 112/80.16 X |

*Primary Examiner*—Peter Nerbun

[57] ABSTRACT

Apparatus and a method for producing articles in which ends of optical filaments are inserted in a fabric; trailing lengths of filament are drawn from the inserted ends, and are captive in a terminal block; many inserted ends form one or more display patterns, and all the trailing lengths of filament of one or more patterns are grouped and retained at one or more common selected portions of the terminal block.

16 Claims, 9 Drawing Sheets

OPTICAL FILAMENT INSERTION APPARATUS

The present invention relates to a method and apparatus for making articles in which the ends of optical filaments are inserted through a fabric, in producing an illuminated display.

BACKGROUND OF THE INVENTION

Articles are known having numerous lengths of light-transmitting or "optical" filament, each having a short "inserted" end extending through a piece of fabric and exposed to view at the "front" or display side of the fabric; at the back of the fabric, trailing lengths of filament extend from the short inserted ends to remote ends ("trailing" ends) for exposure to light sources.

U.S. Pat. No. 4,875,144, issued Sep. 14, 1987, to Harry L. Wainwright, discloses an example of such articles. In the Wainwright patent, the trailing lengths of filament are gathered in bundles; the filaments of each bundle are illuminated concurrently by a common light source. The exposed ends of the filaments of each group form a design that is lit up; multiple patterns of filament ends are lit up concurrently and in sequence, developing a succession of display patterns.

The fabric in such articles is ordinarily a textile, but it may be of any suitable material, synthetic leather for example.

Each filament is commonly a monofilament, but a thread comprising multiple fine light-transmitting fibers may constitute what is here called "a filament".

U.S. Pat. No. 4,854,250 discloses a machine for inserting optical filaments into a fabric, for use in making articles decorated by optical filaments intended to be illuminated. There is no provision in that patent for forming bundles of filaments or otherwise organizing the filaments in groups, in order for filaments that form a pattern to be illuminated concurrently by a common light source.

Still further, an unpublicized method has been proposed for making such articles wherein a short end of an optical filament is inserted into a fabric by a hollow needle; the needle is withdrawn leaving a short inserted end of each filament projecting through the fabric to the front or display side of the fabric; those short ends are adhered to the fabric by rapidly polymerized "glue". Long trailing lengths of the filaments extend from the back of the fabric; those trailing lengths are gathered or organized in groups manually, so that all the filaments of a group can be illuminated together.

SUMMARY OF THE INVENTION

The present invention provides novel apparatus that operates wholly automatically for producing articles comprising a fabric and many lengths of optical filament; a short insertion end of each length of filament extends through the fabric, being exposed to view at the front or display side of the fabric; and each length of filament includes a relatively long trailing length at the back of the fabric extending from a respective short end inserted into the fabric. The short insertion ends form prescribed patterns, and the trailing lengths of filament are organized in groups or bunches, each group to be illuminated by a common light source. An article of this type may have a vast number of lengths of filament having respective "short" insertion ends which, collectively, form a pattern; trailing lengths of filament whose insertion ends form a pattern are secured in groups to parts of a terminal block in a manner that preserves their grouping. A light source for a group of filaments may or may not be assembled to the terminal blocks and yet, by collecting the filaments in secured groups, the organized relationship of the trailing lengths of filament is established and preserved.

As will be seen in the detailed description, below, of the illustrative embodiments of the invention, the novel apparatus has:

A. a filament-end insertion assembly for inserting the free end of a filament extending from a filament supply, the assembly including a lengthwise reciprocated tubular needle, controlled means for feeding a filament from the supply into and along the tubular needle, and a cutter for separating each new length of filament extending from a supply to a "free" end of filament;

B. a fabric support;

C. program-controlled means for producing relative shifts between the fabric support and the filament-end insertion assembly, so that the insertion ends of the filament form prescribed patterns;

D. means for supporting a terminal block and program-controlled means for producing relative shifts between the filament-end insertion assembly and the terminal block;

E. the apparatus including means for drawing a length of filament which trails from each inserted end and which extends at least to said terminal block; and F. means for assembling each said trailing length of filament to a select portion of the terminal block corresponding to insertion of group of ends of filament that form a prescribed pattern.

Several presently preferred illustrative embodiments of the invention are shown in the accompanying drawings and described below in detail. In all of those embodiments, a filament-end-insertion assembly is stationary; the fabric is shifted relative to the filament-end-insertion assembly by an X-Y program-controlled table so that prescribed patterns are formed by the inserted filament ends. Moreover, in each illustrative embodiment, a length of filament is drawn from the supply via the needle, trailing from each newly inserted end of filament. That trailing length of filament is at least long enough to extend from the inserted filament-end to the portion of the terminal block related to the inserted filament end. In one embodiment of the invention, the terminal block is mounted on the same X-Y table that carries the fabric; each trailing length of filament drawn from the supply is extended over a portion of the terminal block selected by the X-Y control program so that groups of trailing lengths of filament are organized at the terminal block to correspond to respective patterns formed by their inserted filament ends.

It is contemplated that the support of the terminal block may be separate from the X-Y table, then the terminal block support could be programmed to operate parallel to the "X" axis or the "Y" axis of the fabric supporting table, such that the terminal block support and the X-Y fabric supporting table would operate in coordination, sharing a common control program.

In one embodiment of the invention, the X-Y table carries the terminal block somewhat beyond the needle. During such traverse of the terminal block, a length of filament is drawn that extends across the back of the fabric from the short insertion end of that filament and across a program-selected part of the terminal block. The drawn length of filament extends from the supply through the needle; the filament is cut in preparation for the next cycle of operation. The trailing length of filament is assembled to the selected part of the terminal block; for example, the filament may be driven into a gripping notch of the terminal block, being grouped there with other trailing lengths of filament which extend from pattern-forming ends inserted into the fabric.

As an incidental detail: if many filaments are to be collected in a group for illumination by a common light source—too many to be received by a single gripping notch of the terminal block—it may be understood that such a large group of filament lengths may be assigned to two or more gripping notches of the terminal block.

A great many filament ends may be required for multiple patterns of the type of article involved. One embodiment of the invention is adapted to reduce the required time of machine operation per installed filament. Toward that end, the time required for drawing the trailing length of filament is curtailed; a catcher hooks the filament between the needle and the newly inserted filament end, almost instantly drawing a doubled-back loop of filament whose length equals or approximates the "trailing length" of filament described above. Upon completion of this loop-drawing stroke the cutter operates, forming a new free end of filament at the needle for insertion into the fabric; that cut also forms the end of the trailing length of filament. The loop of filament is drawn out to overlie the terminal block, and the trailing end is secured in a selected notch of the terminal block. Thereupon, the X-Y table is moved—normally only a short distance—for insertion of the newly cut end of the filament into the fabric. Intervention of the catcher reduces the average movement of the X-Y table, reducing the per-filament cycle time of the apparatus.

As a further variant, for reducing the time required for the apparatus to form and apply vast numbers of filament lengths to a fabric, it is contemplated that two or more filament-end insertion assemblies may be provided and coordinated with mechanism for drawing trailing lengths of filament from the short ends newly inserted in the fabric and for assembling those trailing lengths of filament to select parts of the terminal block. In the illustrative modified apparatus, two or more needles operate concurrently to insert short ends of multiple filaments into a piece of fabric. The trailing lengths of filament extending from their inserted ends are drawn from their supplies of filament, cut, and the trailing lengths are assembled in quick succession to the terminal block. The time required for two or more filament insertion assemblies to apply two or more lengths of filament to a fabric and the filament-grouping terminal block is only a little more than the cycle time of apparatus having one filament insertion apparatus. The increased yield of apparatus having multiple filament insertion assemblies represents a distinct economy.

Two of the provisions described briefly above for reducing the time required by the apparatus to insert filament ends are combined in one of the embodiments of the invention detailed below, combining the time-saving advantages of both of those provisions.

Illustrative embodiments of various aspects of the invention are shown in the accompanying drawings and described in detail below. Further aspects of the invention are explained in the detailed description, in addition to those expressed above. Still other embodiments will become apparent to those skilled in the art; consequently the appended claims should be construed broadly.

DETAILED DESCRIPTION OF THE ILLUSTRATIVE EMBODIMENTS

Figures 1, 1A:
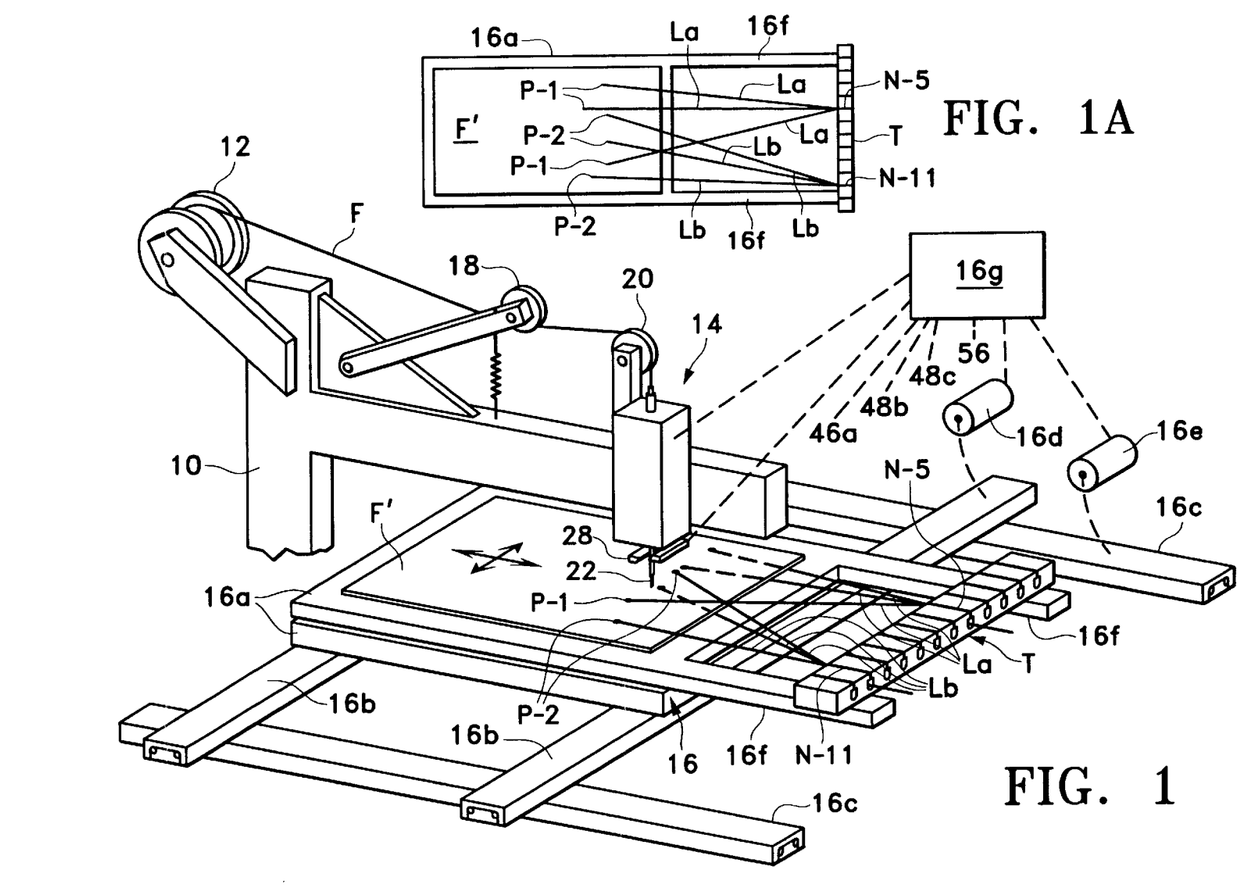
FIG. 1 is a perspective view of a first embodiment of certain aspects of the invention.
FIG. 1A is a plan view of a portion of FIG. 1, showing those filaments appearing in FIG. 1.

FIG. 1 shows one illustrative embodiment of certain aspects of the invention. In FIG. 1, frame structure 10 supports a reel 12 of filament F which is guided by tensioned idler 18 and stationary idler 20 to a mechanism 14 that is to insert the free end of filament F into fabric F'.

Fabric F' is tensioned under mechanism 14 by a two-part frame 16a, being part of an X-Y table 16 carried by crossed rails 16b and 16c. Diagrammatically represented X-actuator 16d and Y-actuator 16e shift fabric F' under program control to locate any selected point under needle 22. Many points of the fabric receive short filament ends, forming a pattern or multiple patterns.

X-Y table 16 has arms 16f that support a terminal block T.

After a short filament end has been inserted into the fabric, it is secured in place by polymerized glue as described below (or by other suitable means). The X-Y table is then shifted for drawing a length L of filament that trails from the end that is inserted into the fabric to the opposite end in the terminal block. The notch that is to receive a trailing length of filament is selected under program control, so that (see FIGS. 1 and 1A) certain lengths of filament La whose inserted ends form one pattern P-1 in the fabric and are grouped in a selected notch N-5 in the terminal block T while other lengths Lb of filament whose inserted ends form another pattern P-2 in the fabric are grouped in another notch N-11. If a pattern has a great many filament lengths, it may be sensible to designate two (or more) notches (slots) in the terminal block that are to receive and group the filament lengths of a single pattern.

Only one tensioned idler 18 and only one stationary idler 20 are shown, but it may be appropriate to use multiple tensioned rollers and multiple idlers to provide multiple slack loops so that, when the table is shifted suddenly to draw a length L of filament, the tensioned loops will avoid sudden pulls of filament from the supply reel. A friction drag or a clutch may be provided for inhibiting spin of reel 12 if and when a sudden pull of the filament occurs.

Figure 2:
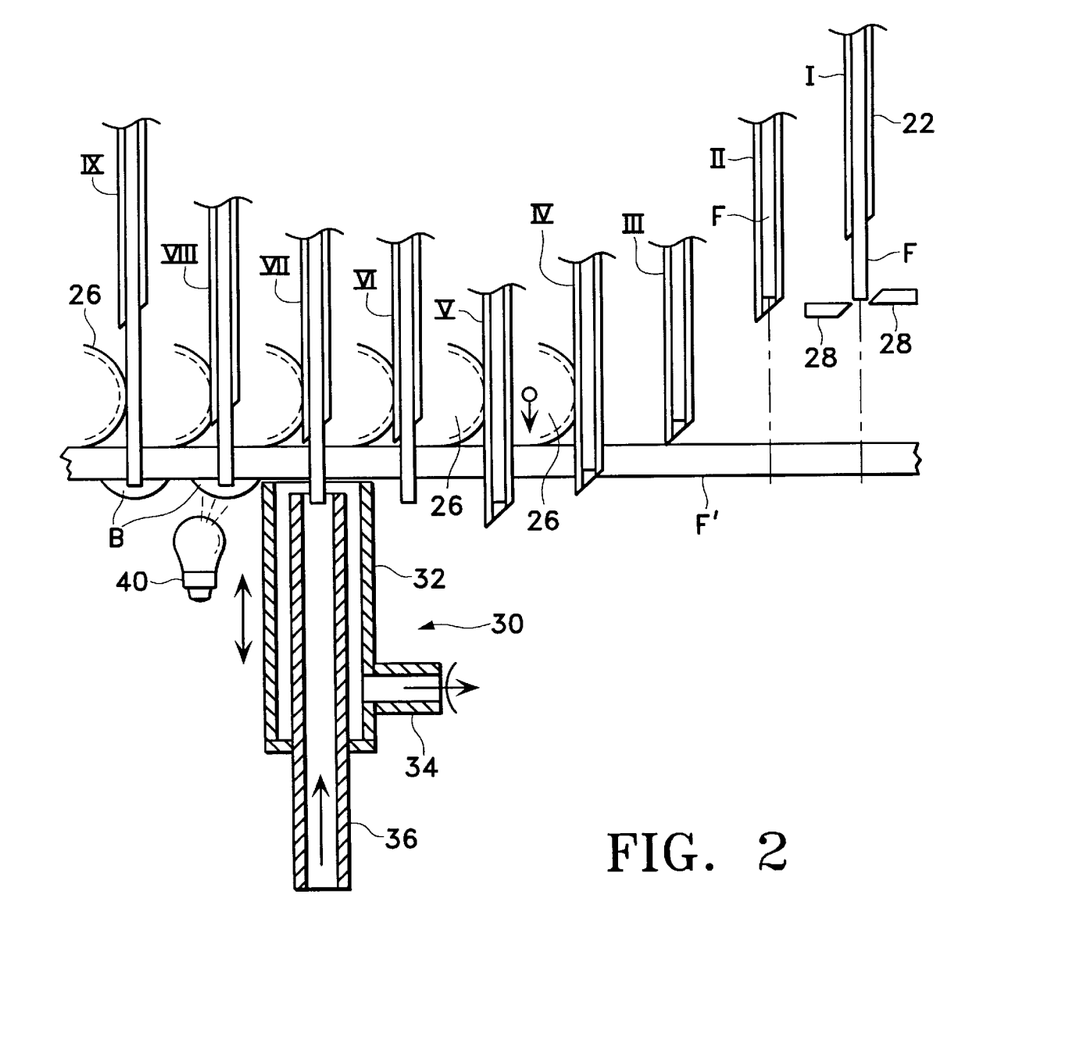
FIG. 2 is a sequence of enlarged diagrams representing the operation of Fig. 1 in the insertion and retention of a filament end into a piece of fabric.

FIG. 2 is a sequence of diagrams of the cyclically repeated motions performed by assembly 14 for inserting the "short insertion ends" of filament F into fabric F'.

In Diagram I, which represents the start and end of each cycle, the tip of needle 22 is shown retracted vertically from cutter 28. Free ends of the filament are produced by the cutter; a free end projects from the needle in Diagram I. Needle 22 starts its "down" stroke (Diagram II) while filament F is stationary; the free end of the filament becomes sheathed in the needle. The needle is then driven to and through the fabric F' (Diagrams III and IV). At this point or shortly afterward, hold-down device 26 is shifted against the fabric.

Diagram V in FIG. 2 represents the deepest penetration of the needle and filament F through fabric F';. Unlike the relationship in Diagram I, the free end of filament F in Diagram V is sheathed in the needle; in this condition, a short end portion of the filament (the "short insertion end") projects through the fabric. In Diagram VI the needle has been retracted from the fabric; holddown device 26 prevents needle 22 from lifting the fabric. A control mechanism maintains the penetration of the filament through the fabric, to insure that the discrete short insertion end of the filament is not pulled up with the needle.

The end of the filament that projects through the fabric is bare in Diagrams VI and VII.)

Figure 3:
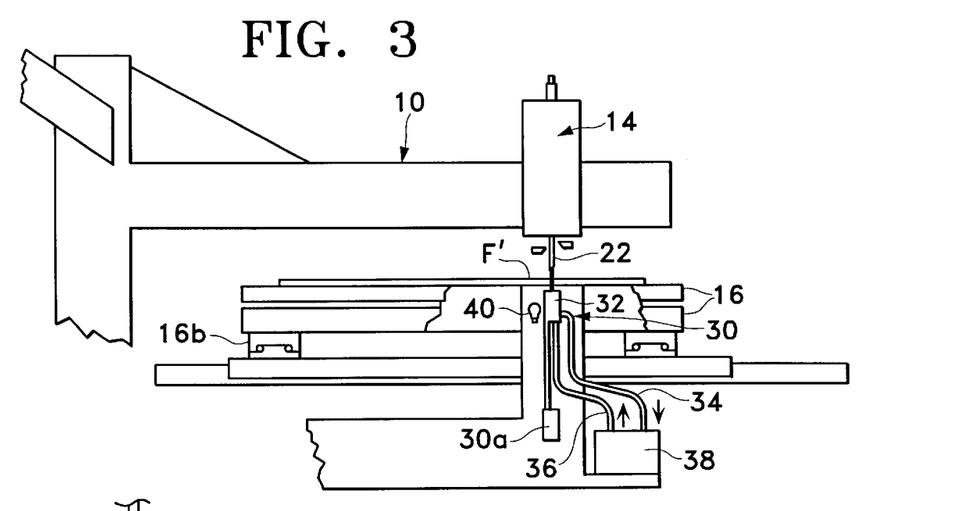
FIG. 3 is a lateral view of the apparatus of FIG. 1, parts being broken away for clarity.

FIGS. 2 and 3 show a presently preferred method of securing each insertion end of the filament to the fabric. Fluid applicator 30 is located below fabric F' and in alignment with needle 22, for applying a fluid to the insertion end of the filament (Diagram VII. That fluid polymerizes rapidly. The fluid applicator includes an outer tube 32, a fluid-return tube 34, and a supply tube 36. A reservoir 38 for the fluid has an internal circulating pump (not shown) for delivering fresh fluid to the filament ends. Actuator 30a reciprocates unit 30 in time with the operation of the filament control mechanism and the needle-reciprocating mechanism so as to apply a controlled bead B of fluid to the projecting bare insertion end of filament F (Diagram VII). At all other times, applicator 30 remains retracted from the fabric.

The entire sequence of motions of FIG. 2 is initiated when program 16g controls the X-Y table so as to locate the fabric at a position that is to receive an insertion end of the filament. Program 16g that controls the X and Y motions of table 16 also activates the mechanisms of assembly 14 and the fluid-applicator 30.

After fluid applicator 30 has been withdrawn from the fabric, the bead of fluid is exposed to a polymerizing light source 40. The fluid applicator 30 should be shielded from the light of source 40, to prevent build-up of polymerized fluid on tube 32.

The entire operation of applying and setting the fluid is brief, one-half second, for example. The result is the firm securement of each short insertion end of the filament to the fabric. No novelty is asserted here for that mode of securement. As an alternative, heat might be applied to fuse the tip of the filament in Diagram VII.

In the article to be produced, a "trailing length" L of filament extends from each short insertion end to a selected securement point of a terminal block T. The X-Y table is operated through a relatively long stroke under program control to bring a selected notch or slot of the terminal block to mechanism 14. The just-inserted end of the filament is shifted away from mechanism 14. That stroke of the table forces the "trailing" length of filament to be pulled from supply reel 12 via needle 22 and roller 26.

Figure 4A:
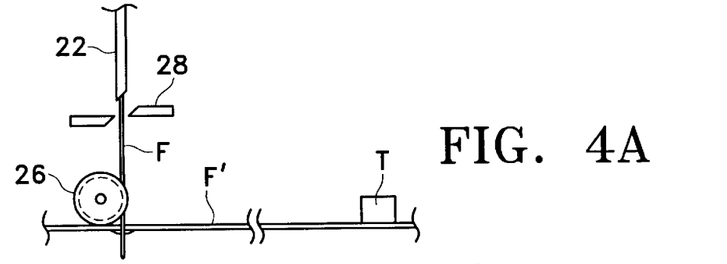
FIGS. 4A, 4B and 4C are diagrams of progressive stages in the operation of the apparatus of FIG. 1 after a filament end has been inserted into a piece of fabric.
Figures 4B, 4C:
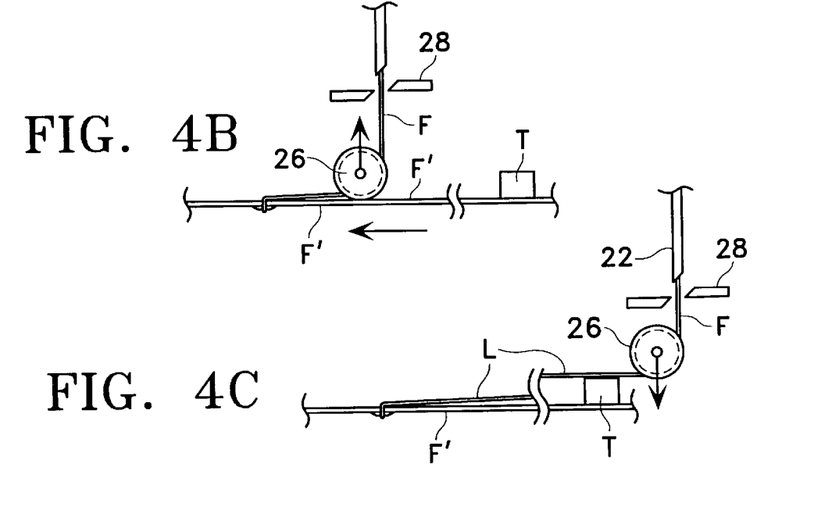

The motions involved in drawing trailing lengths of filament are represented in FIGS. 4A, 4B and 4C. FIG. 4A represents Diagram IX of FIG. 2. The short insertion end of a filament has been secured to the fabric by polymerized fluid and needle 22 has been retracted. The filament is exposed to be cut, later, by cutter 28. Roller 26 is at the side of the needle axis remote from the terminal block in FIG. 4A.

FIG. 4B shows the start of the stroke of the fabric carried by the X-Y table that produces a trailing length of filament.

FIG. 4C shows the completion of the stroke. Fabric F', carried by the X-Y table, has drawn a trailing length L of filament from the supply reel via the tubular needle and around roller 26. The terminal block passes under roller 26 during the stroke of the X-Y table that ends in the condition of FIG. 4C. Roller 26 was raised under program control in preparation for this shift of the table. In the condition of FIG. 4C, the groove in the roller and the selected notch in the terminal block are in alignment. The filament is taut, due to tensioned idler roller 20 and the drag in the supply reel. The roller is shifted rapidly down-and-up under program control, first forcing the filament into the selected notch of the terminal block, then raising roller 26 clear of the terminal block in preparation for a return stroke of the X-Y table. This completes the cycle of operations of inserting a short insertion end of the filament into the fabric, drawing a trailing length of filament L, and securing its trailing end to the terminal block. Following the "down" stroke of roller 26, cutter 28 is activated to produce the relationship of Diagram I, FIG. 2.

Figure 5:
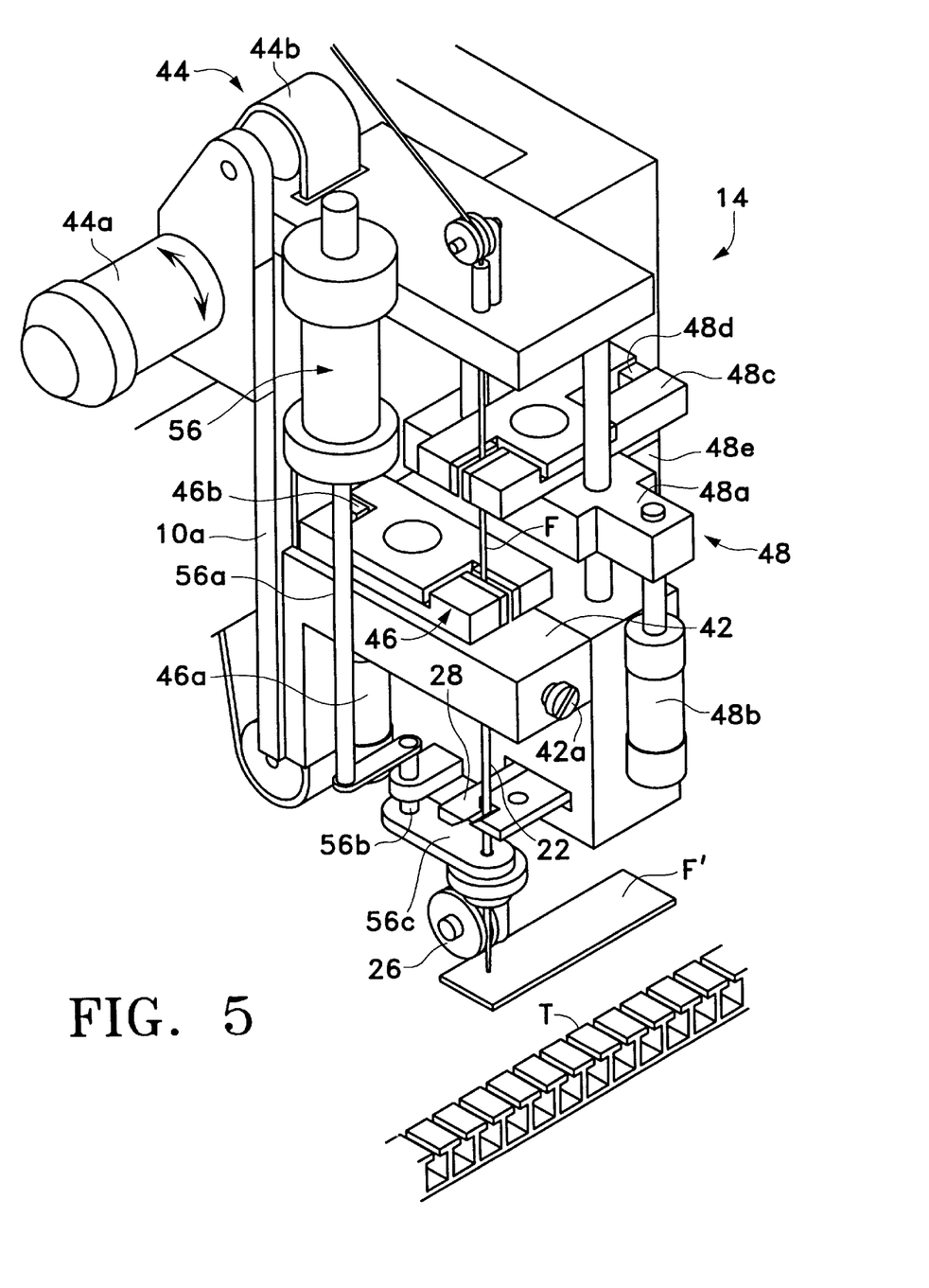
FIG. 5 is an isometric view of an assembly, useful as an example of assembly 14 in FIG. 1.

An illustrative form of mechanism that may be used for assembly 14 of FIG. 1 is shown in FIG. 5.

Needle carrier 42 is supported on frame portion 10a by rails or rods (not shown) for up-and-down strokes. Needle 22 is clamped to carrier 42 by screw 42a. Needle carrier 42 operates up-and-down in uniform strokes. Needle carrier 42 is fixed to belt 44b of actuator 44.

Actuator 44 operates needle carrier 42 once each time in the whole program when an end of filament F is to be inserted in fabric F'. Drive unit 44a of actuator 44 operates in forward and reverse strokes to force endless belt 44b to drive the needle carrier down and then up. Penetration of the needle through the fabric is adjusted by program-control of drive unit 44a.

A filament-gripping pivoted-jaw clamp 46 and clamp-actuator 46a are fixed to needle carrier 42. Cam or wedge element 46b is shifted up, then down, by actuator 46a to close clamp 46 and hold the clamp closed from the phase represented by Diagram II (FIG. 2) through phases ending with Diagram V; this action forces the filament to move downward in unison with the needle.

Assembly 14 also includes a mechanism 48 for controlling filament F at discrete moments in the cycle represented in FIG. 2. Filament control mechanism 48 has a few functions. One function is to drive filament F through a short up-and-down stroke at the phase represented by Diagram VII (FIG. 2). This has the effect of enhancing firm bonding of the filament to the fabric. To perform this up-and-down stroke of the filament, assembly 48 includes a member 48a that slides vertically along the rods shown. Actuator 48a executes a uniform down-and-up stroke once each time that actuator 48b is operated. Member 48 carries a pivoted-jaw clamp 48c and an actuator 48e for driving wedge or cam 48d to operate clamp 48c. The clamp grips the filament during the full up-and-down motion of member 48a, for agitating the free end of the filament in the glue during the phase represented by Diagram VII of FIG. 2. If this function were omitted, member 48a would be fixed to portion 10a of the machine frame and actuator 48b would be omitted.

In a second function of filament-control mechanism 48, clamp 48c is closed to grip filament F, member 48a being stationary, for maintaining the filament motionless during the transition from Diagram I to Diagram II (FIG. 2) and during the transition from Diagram V to Diagram VI. The needle is operated vertically in each of those transitions. Friction between the needle and the filament has a tendency of dragging the filament with the needle. Clamp 48c prevents the filament from being shifted unintentionally with the needle during the transitions.

Assembly 14 in FIG. 5 also includes roller 26. Actuator 56 when energized drives rod segments 56a and 56b downward. Actuator 56 is energized once when the fabric carried by the X-Y table is to be held down, and again when the trailing length of filament is to be driven into a selected slot in the terminal block T.

The trailing length of filament is taut and controlled at the time the filament is being forced into a slot in the terminal block. After the end of the filament has thus been fixed in the terminal block, an actuator (not shown) operates cutter 28, to create a free end of the filament as represented in Diagram I of FIG. 2.

All of the sequential operations described above are coordinated by a continuous control program 16g whose details are commonplace and are not shown and described here in detail.

The control for the X and Y drives of the table to place particular spots of fabric in line with needle 22 are well known, as in embroidering machines. Following placement of the X-Y table so as to carry a piece of fabric into proper position for a short insertion end of filament to be inserted as a pixel of a desired pattern, the various actuators of assembly 14 are energized or activated in the required sequence and timing, to insert the filament end into the fabric, to glue its end to the fabric, to withdraw the hold-down roller, to position a selected slot of the terminal block in alignment with length L of filament extending from the short inserted end, to drive the filament into captive relation to the selected terminal block slot, and finally to cut the filament in readiness for a new cycle.

The apparatus of FIGS. 1–5, desibed above, is highly effective for producing articles like that in the Wainwright patent. An appreciable time interval is required to complete each cycle of, first, inserting and securing a short insertion end of filament in a piece of fabric, and, second, drawing the trailing length of filament to the terminal block and securing the trailing filament end to a selected portion of the terminal block, and, finally, returning the fabric into position to start a new cycle. If two or more program-controlled filament-end insertion assemblies were used in succession in duplicated cycles of operation, the time per cycle would be unchanged; hence, there would be no advantage to introducing multiple filament-insertion assemblies.

Figures 6, 6A:
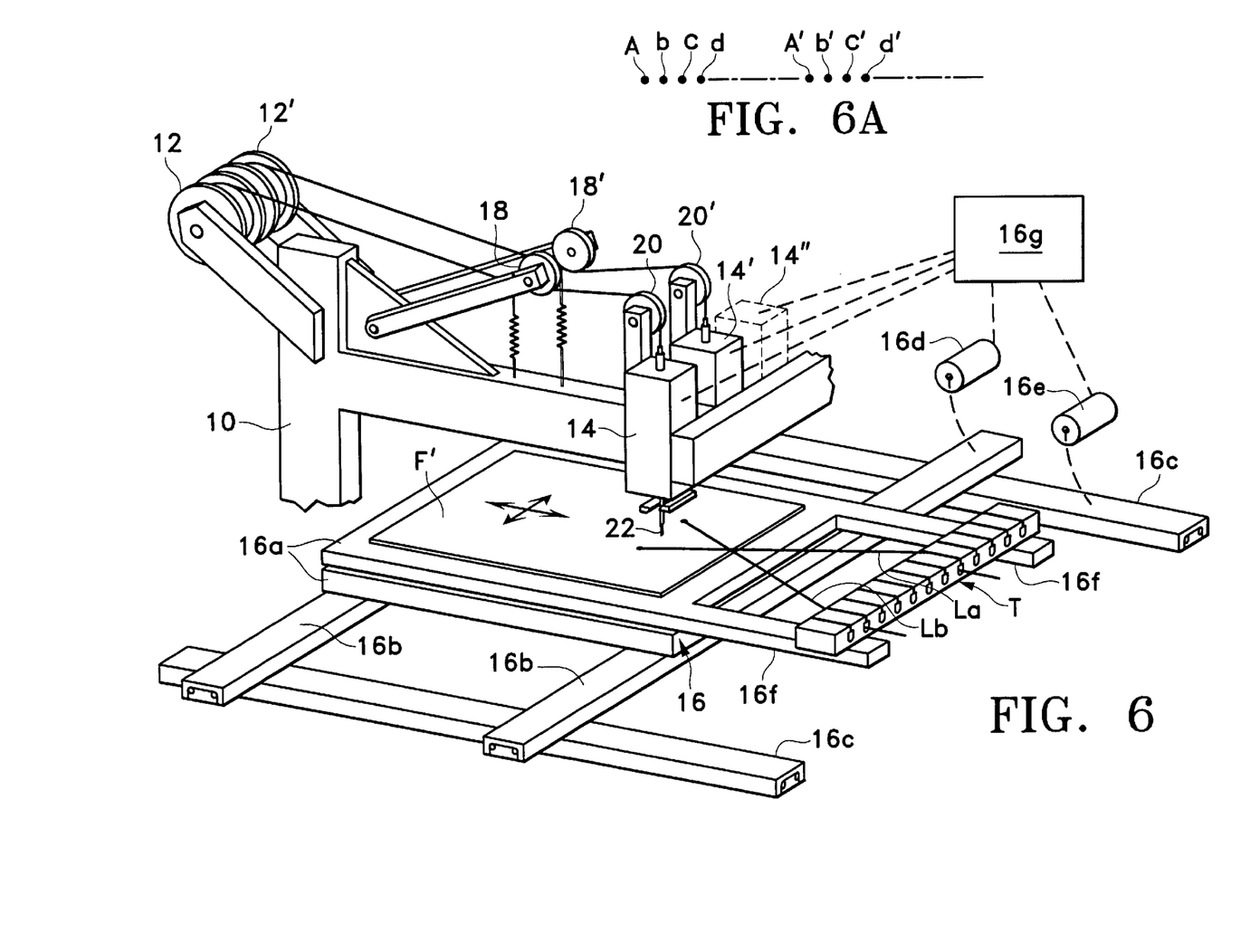
FIG. 6 is a perspective view of a modification of the apparatus of FIG. 1, involving further novel aspects.
FIG. 6A is a diagram representing a sequence of insertion of filament ends performed by the apparatus of FIG. 6.

The apparatus of FIG. 6 is a second illustrative embodiment of the invention, making distinctive use of multiple filament-end insertion assemblies. Certain aspects of the invention are common to both FIGS. 5 and 6; each has its own distinctive merit.

The same numerals are used in FIG. 1 and in FIG. 6 to designate the same parts appearing in both Figures. However, FIG. 6 includes multiple filament insertion assemblies; the second assembly and its constituent parts bear primed numerals, the same numerals as are used for the first assembly. A third assembly 14" is contemplated.

The apparatus of FIG. 6 may be used in various ways. For example, the desired product may require an area filled with inserted filament ends. Those filament ends may be arranged in lines or rows, so that many filament ends, when illuminated, will constitute pixels of a design or pattern or multiple simultaneous multicolor designs or successive designs or patterns.

Let it be assumed that two assemblies 14 and 14' provide needles spaced five centimeters apart and that the X-Y table is programmed to insert 8 filament ends per centimeter along a row or line.

A program may comprise the following:

(1) The needles of assemblies 14 and 14' may be operated concurrently to insert filament ends A and A' (FIG. 6A);

(2) The table-control program may then shift the terminal block T so that a trailing length of filament extending from inserted filament end A will be aligned with a selected filament-receiving notch in the terminal block;

(3) Operation of assembly 14 under program-control causes that trailing length of filament to be assembled to the terminal block; and (4) The trailing length of filament is cut from the supply of assembly 14 (Diagram I, FIG. 2);

(5) Next, the control program causes the table to shift so as to position the trailing length of filament extending from filament end A' (FIG. 6A) at a selected notch of the terminal block;

(6) The program causes assembly 14' to assemble that trailing length to the terminal block;

(7) and causes that trailing length of filament to be cut free of the filament supply of assembly 14', concluding a cycle.

The program causes the table to shift the fabric so that the needles of assemblies 14 and 14' are in position to insert respective filament ends at locations b and b'. Thereafter, program steps (2) through (7) are repeated for the trailing lengths of filament whose ends are inserted at locations b and b'.

Under program control, filament ends are inserted at locations c and c', and at d and d', and so on until a full line of inserted filament ends is completed, each filament end having a trailing length extending to a selected portion of the terminal block. In this example, a line of inserted filament ends ten (10) centimeters long has been produced. The same sequence can be used to extend the just-completed line to a length of twenty (20) centimeters.

A second line of filament ends can be inserted in the fabric immediately below the first line, repeating the process until filament ends fill the area.

Selection of the notches in the terminal block is governed by the desired grouping of the trailing lengths of filament, to provide for simultaneously lit groups and sequentially lit groups of filament ends.

The described program is not rigid; it can be modified so that some cycles of filament-end insertion, etc., for one or both of the assemblies 14 and 14', is suppressed or skipped where some filament ends are not needed for any pattern.

The apparatus of FIG. 6 makes efficient use of time, in this sense providing high productivity. And, while it is true that the use of two assemblies 14 and 14' does not double the yield, the average cycle time is reduced. The long stroke of the table in shifting the terminal block to assemblies 14 and 14' is utilized for the trailing lengths of filament of both of the newly inserted filament ends. Similarly, the long stroke of the table in returning the fabric into position for insertion of new filament ends is utilized by both assemblies 14 and 14'.

FIGS. 7–15 show a third form of apparatus for producing articles bearing inserted ends of optical filaments in a piece of fabric, the filaments being grouped at a terminal block in accordance with designs or patterns formed by the inserted filament ends. The apparatus of FIGS. 7–15 utilizes many components of FIGS. 1–5. The same components in FIGS. 7–15 as those in FIGS. 1–5 bear the same reference numbers; the description of their structure and operation will be understood without repetition.

Base 60 (FIG. 8) bears pairs of crossed X-Y slide guides 16b and 16c that support an X-Y table 62. This table is enlarged as compared to X-Y table 16 of FIG. 1. Table 62 is operated along "X" and "Y" coordinates by diagrammatically represented drives 16d and 16e.

Figure 7:
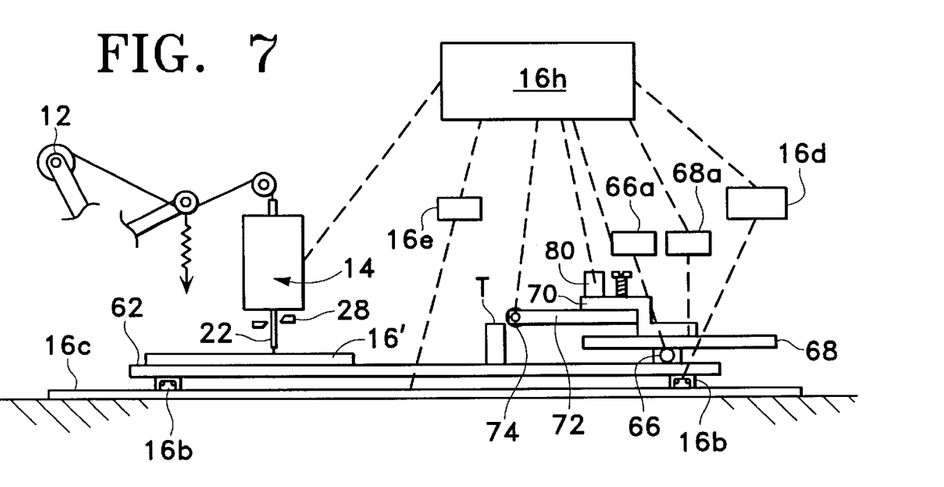
FIGS. 7 and 8 are a lateral view and a top plan view of a third embodiment of the invention, including further novel aspects.
Figure 8:
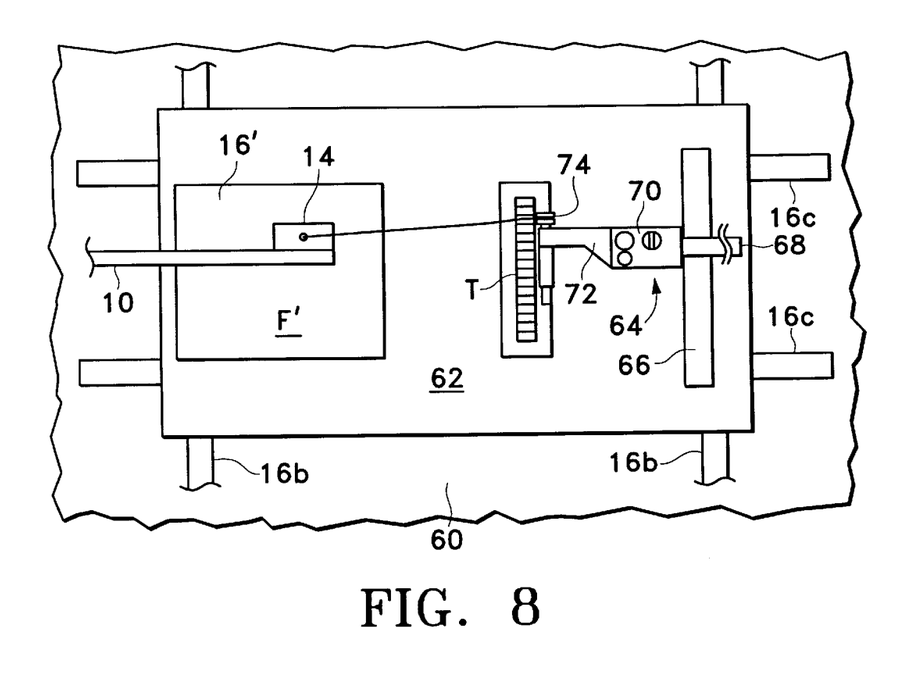

Table 16' of FIGS. 7 and 8 is fixed to table 62; table 16' comprises a frame for clamping and tensioning a piece of fabric F'. Terminal block T is mounted on X-Y table 62. As an alternative, terminal block T may be mounted on its own program-controlled slide guide (not shown).

"Catcher" assembly 64 is also carried by X-Y table 62.

Catcher assembly 64 includes crossed X and Y slide guides 66 and 68, operated by drives 66a and 68a, respectively. Guide 66 carries guide 68 which, in turn, carries bracket 70. An arm 72 is carried by bracket 70, so as to be movable bodily up and down in FIG. 7. (See details below.) Arm 70 is shown "up" in FIG. 7. Arm 72 in turn, supports catcher 74 slidable along an axis parallel to terminal block T and parallel to slide guide 66.

Figure 9:
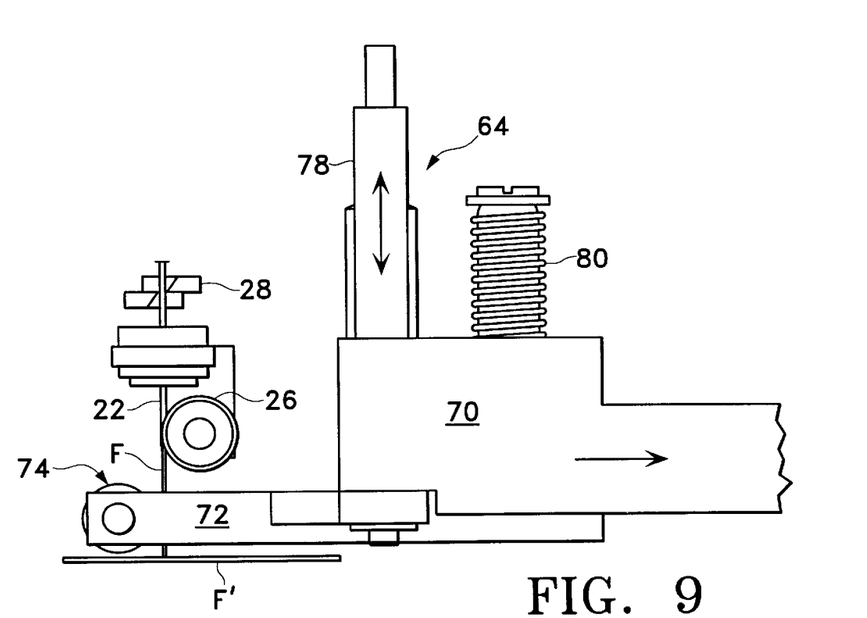
FIGS. 9 and 10 are a fragmentary elevation and a top plan view of a portion of the apparatus of FIGS. 7 and 8 in one phase of operation of the apparatus.

Drive 68a is operable to shift the entire catcher assembly horizontally between an extreme position at the right, as shown in Fiq. 7, and an extreme position to the left of needle 22 as shown in FIG. 9.

Catcher 74 (FIGS. 9 and 10) includes reversely domed discs 74a and 74b confronting each other, disc 74a being movable and being biased by compression spring 74c to bear against fixed disc 74b. Catcher 74 is designed to provide a light frictional grip of a filament F. This catcher is slidable along a rod in arm 72. An electromagnet 76 when energized drives catcher 74 from the solid-line position in FIG. 10 to the broken line position; when the electromagnet is deenergized, catcher 74 is returned to the solid-line position of FIG. 10 by a spring (not shown).

Figure 11:
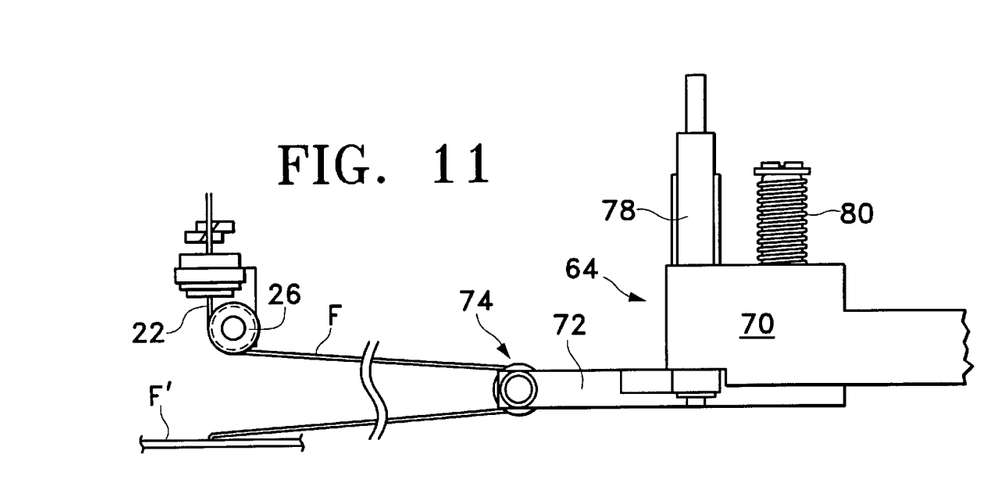
FIGS. 11 and 12 are a fragmentary elevation and a top plan view of part of the apparatus of FIGS. 7 and 8 at a phase operation that follows that of FIGS. 9 and 10.
Figure 12:
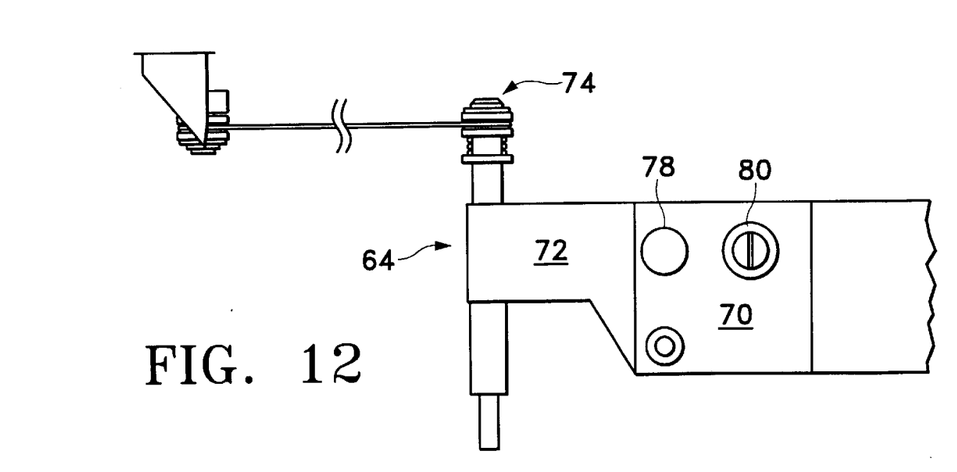
Figure 13:
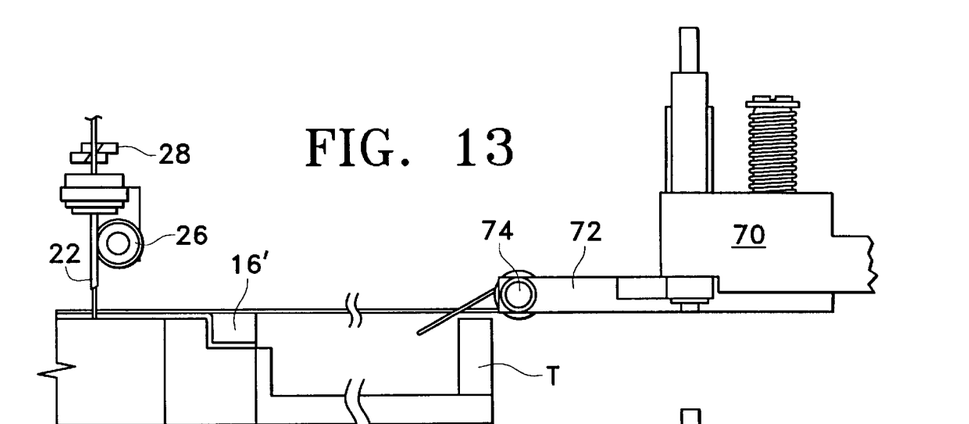
FIGS. 13, 14 and 15 are fragmentary elevations of the apparatus of FIGS. 7 and 8, illustrating phases of operation subsequent to the phase of FIGS. 11 and 12.

Catcher 74 and its arm 72 are operable to "up" and "down" positions relative to bracket 70 by an electromagnet 78 and a compression spring 80. In FIGS. 9, 11 and 13, arm 72 is shown in its raised or "up" position.

Figure 10:
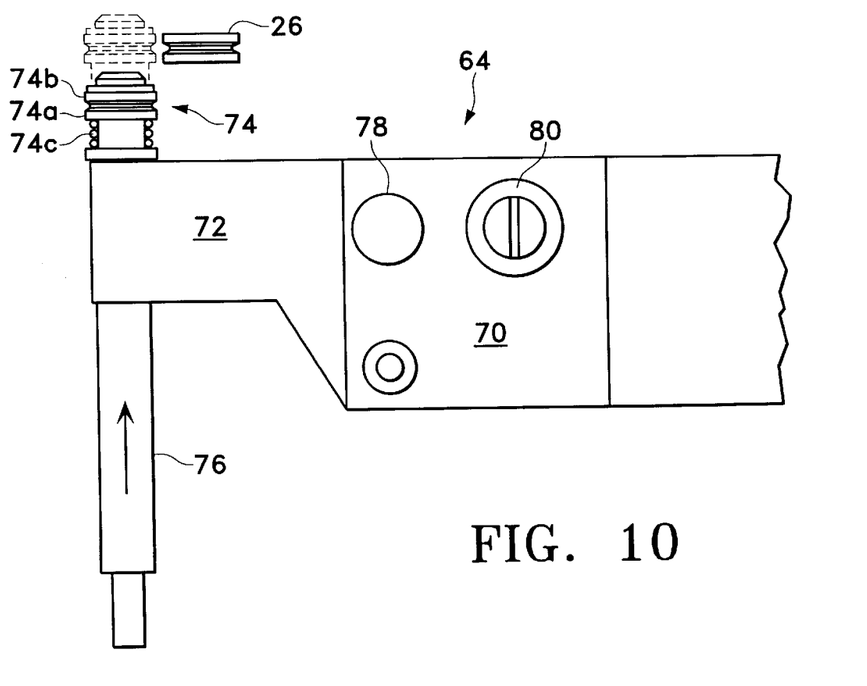

The entire operation of catcher 74 may now be reviewed, referring first to FIGS. 9 and 10 in the context of FIGS. 1–5. All of the operations are controlled by program 16h.

In FIG. 10, arm 72 and catcher 74 are at their left extreme position, due to drive 68a. Roller 26 is raised by assembly 14, and filament F extends from raised needle 22 to fabric F'as in Diagram IX (FIG. 2). Energizing electromagnet 76 shifts catcher discs 74a and 74b into position at the left of filament F (dotted lines, FIG. 10).

When drive 68a is then operated, the catcher shifts through a stroke (FIGS. 11 and 12) that equals, or somewhat exceeds, half of the "trailing" length of filament that is to extend from the just-inserted short filament end (Diagram IX) to or a bit beyond the terminal block. That "trailing" length of filament varies in length because the location of the inserted filament end in fabric F' varies. Therefore, the "half-way" stroke of the catcher is regulated under program control. The filament has a doubled-back loop between roller 26 and the filament end inserted in fabric F' (FIG. 11). The filament remains taut during this "half-way" stroke; the filament is being drawn from supply 12 (FIG. 1), and is taut as described above in connection with FIG. 1.

The motion of catcher 74 may hesitate at this "half-way" point along its stroke to the right. (The hesitation may be omitted.) When this "half-way" stroke of the catcher is completed, cutter 28 of assembly 14 (FIG. 7) operates. Assembly 14 is then in the condition represented by Diagram I of Fig. 2. As the stroke of catcher assembly 64 to the right continues, discs 74a and 74b provide a light frictional grip of the filament so that the filament remains taut between its inserted end in fabric F' and the catcher.

The stroke of catcher assembly 64 to the right (away from assembly 14) is shown in FIG. 13. Catcher 74 remains "up" during this stroke, sweeping over and past the terminal block. During this stroke of the catcher, slide guide 66 is shifted for positioning catcher 74 in alignment with that particular ("selected") notch or slot of the terminal block which is to receive that particular trailing length of filament.

Figure 14:
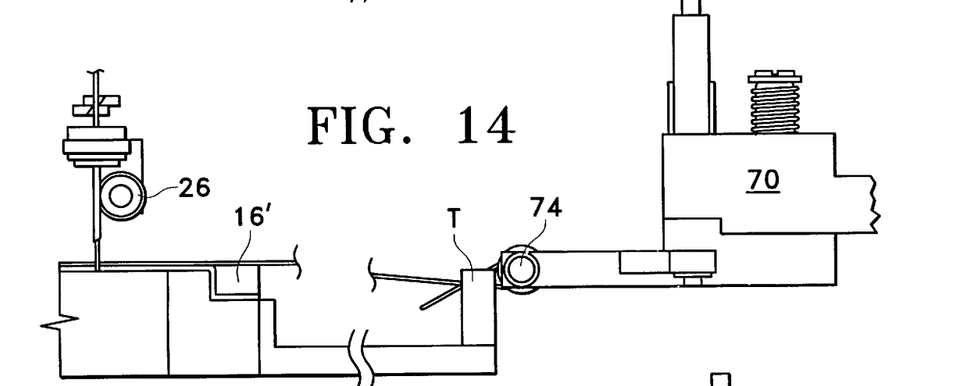
Figure 15:
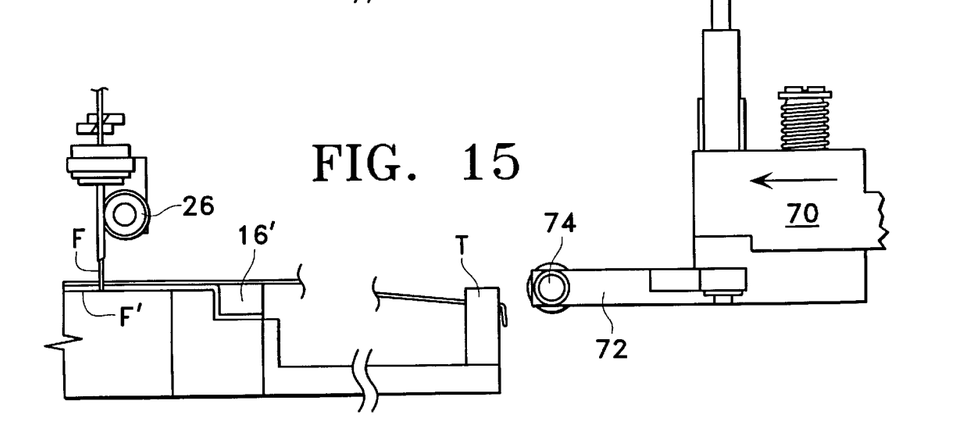

FIG. 14 shows catcher 74 shifted "down" momentarily by activation of electromagnet 78. This motion of the catcher drives the trailing length of filament into the selected notch of the terminal block. Catcher 74 moves somewhat further to the right (FIG. 15), disengaging the end of the trailing length of filament, and electromagnet 78 causes the catcher to shift "up". The catcher assembly 64 is then driven back to the left, under program control, to assume the position represented in solid lines in FIG. 10.

At the start of the described sequence of motions of the catcher (FIG. 9), the filament end has been inserted into the fabric at a selected location, and the "glue" applicator and the lamp have secured the filament end to the fabric. While the catcher executes part of the described sequence of motions, the lamp remains in position to perfect the polymerization of the applied glue.

At the end of the "half-way" stroke of the catcher, the filament is cut, creating the condition of Diagram I (FIG. 2).

Assembly 64 is shifted along rail 66 to be located at a selected position along terminal block T and the trailing length of filament is forced into the selected notch of the terminal block. As soon as the filament is cut, table 62 is freed for program-controlled operation relative to needle 22 of assembly 14 to locate the next selected position in fabric F' where a filament end is to be inserted, and the needle is operated to perform that insertion. The phases of operation represented by Diagrams II through VIII (FIG. 2) take place during the same time interval as is needed for the catcher to shift from its right extreme (Fig. 15) to its left extreme (FIG. 10). Accordingly, the cycle time of the apparatus of FIGS. 7–15 is reduced compared to the cycle time of the apparatus of FIGS. 1–5, and the apparatus of FIGS. 7–15 has the potential of increased curing or polymerizing time for the glue.

The apparatus of FIGS. 7–15 may be reorganized readily to incorporate multiple assemblies 14 in the manner represented by FIGS. 6 and 6A, as a fourth embodiment of the invention.

Many changes may be introduced in the foregoing embodiments of the invention by those of ordinary skill. For example, an electromagnet which is energized to establish one operative condition and which is spring-returned upon deenergization to establish the reverse condition may be used in reverse, i.e., the spring may be arranged to establish that "on" condition and the electromagnet when energized may be arranged to establish the reverse condition. Moreover, the electromagnets mentioned in the above description may be replaced by other forms of actuators. Roller 26 may be replaced or supplemented by a pressure foot such as that which is used in sewing machines. Because of the many choices of rearrangement and substitutions, the invention should be construed broadly in accordance with its true spirit and scope.

We claim:

1. Apparatus for producing articles having lengths of optical filament extending from respective first filament ends inserted in a piece of fabric, said apparatus including:

i. a filament-end insertion assembly having filament supply means and means for cutting multiple lengths of filament from said supply means;

ii. a fabric support for holding a piece of fabric in position for insertion of first ends of said filament lengths by said filament-end insertion assembly;

iii. a terminal block support; and iv. program-controlled means for effecting relative shifts between said filament-end insertion assembly and both of said supports so that, for successive lengths of filament, first ends of the lengths of filament form a pattern or multiple patterns of filament ends inserted in the fabric and second portions of the lengths of filament are accumulated as one or more groups at portions of the terminal block corresponding to said pattern or patterns.

2. Apparatus as in claim 1, wherein said means for causing relative shifts between the fabric support and the filament-end insertion assembly serves as a means for drawing filament from said supply means, divided into multiple lengths by said cutting means.

3. Apparatus as in claim 1, said apparatus including a catcher operative to draw a loop of filament between said filament-end insertion apparatus and each filament end that was inserted into the fabric, said cutting means then being operative to cut the loop from the filament supply means and thereby define a said length of filament.

4. Apparatus as in claim 1, further including a second filament-end insertion assembly having second filament supply means and second means for cutting multiple lengths of filament from said second filament supply means, both of said filament-end insertion means being programmed for inserting respective filament ends into a piece of fabric, said apparatus being programmed for thereafter drawing respective lengths of filament from said inserted filament-ends to successive selected portions of said terminal block.

5. A method of making articles having a piece of fabric bearing many lengths of optical filament, an end of each length of filament being inserted in the piece of fabric, including the steps of inserting an end portion of filament from a filament supply into a piece of fabric at a selected position to constitute an element of a display pattern, drawing a length of filament trailing from said inserted end portion and disposing a second portion of said length of filament at a selected part of a terminal block, cutting said filament from said supply and thereby producing a new end of the filament for insertion into the fabric, and repeating the foregoing steps in cycles with respect to succeeding lengths of filament wherein:

the selected positions of the inserted filament ends are varied in succeeding cycles of steps to constitute a pattern or multiple patterns of end portions of filament inserted in the fabric, and wherein:

said second portions of all of those lengths of filament whose inserted end portions constitute elements of any one pattern are disposed at a part or parts of the terminal block dedicated to said one pattern.

6. Apparatus for producing an article having a sheet bearing many lengths of optical filament, an end of each length of filament being inserted in the sheet so that the inserted ends form elements of one or more display patterns of many inserted ends, said apparatus including:

i. a filament-end insertion assembly for inserting an end of a length of filament into a sheet;

ii. a sheet support;

iii. an array of collection devices, each collection device being adapted to receive multiple lengths of filament extending from inserted filament ends; and iv. program-controlled equipment for causing coordinated operation of the foregoing portions of the apparatus, so as to cause the filament-end insertion assembly to insert the end of a length of filament into a sheet carried by the sheet support at a program-selected position in the sheet, said program-controlled equipment causing a portion of the length of filament which extends from its inserted end to be disposed at a program-selected one of said collection devices, said program-controlled equipment being operable in succeeding cycles to cause insertion of a multiplicity of filament ends into the sheet at positions forming multiple display patterns and to cause portions of the lengths of filament that extend from those inserted filament ends to be disposed at one or more of said collection devices each of which is dedicated to only one of said display patterns.

7. Apparatus as in claim 6, including means for drawing from a filament supply lengths of filament extending from the inserted filament ends and means for severing each drawn length of filament from the filament supply, the severed end of filament from the filament supply becoming another filament end to be inserted.

8. Apparatus as in claim 6, wherein said sheet support and said array of collection devices constitute a unitary structure, said sheet support and said array of collection devices thereby being fixed in relation to each other, said unitary structure and said filament-end insertion assembly being movable relative to each other so that filament ends may be inserted into a sheet at a succession of positions constituting multiple patterns of inserted filament ends, said program controlled equipment causing program-controlled relative movement between the filament end insertion assembly and said unitary structure so that a succession of lengths of filament are drawn from a filament supply after the insertion of filament ends into the sheet, the program-controlled relative movement being effective to dispose portions of those lengths of filament, which extend from pattern-forming inserted filament ends, at collection devices dedicated to said display patterns, said apparatus having means for severing each length of filament from the filament supply and thereby forming a new filament end for insertion into the sheet.

9. Apparatus as in claim 6, wherein said filament insertion assembly provides a filament supply and wherein, following each insertion of a filament end into the sheet, said equipment causes relative shift between the sheet support and the filament-end insertion assembly in such manner that a length of filament is drawn from the filament supply and a portion of the drawn length of filament is disposed at a program-selected one of said collection devices, the program controlled equipment in a sequence of cycles causing portions of those filament lengths, whose inserted ends form any one pattern, to be disposed at one or more of said collection devices dedicated to such one pattern.

10. Apparatus as in claim 6, including means for drawing a succession of loops of filament each of which extends from a filament supply to an inserted filament end that constitutes an element of a display pattern, and means for severing each loop from the filament supply and thus creating a trailing filament portion of the loop, said apparatus having means for bringing into alignment each trailing filament portion of the loop and one of said collection devices so as to group the trailing filament portions in accordance with the display pattern or patterns formed by the respective inserted filament ends of said loops.

11. Apparatus as in claim 6, including at least one additional filament-end insertion assembly for inserting an end of a length of filament into the sheet, the program-controlled equipment coordinating the recited portions of the apparatus so that lengths of filament extending from the inserted filament ends of plural filament end insertion assemblies are grouped at collection devices related to the pattern or patterns of which each inserted end is a part.

12. Apparatus as in claim 6, further including means responsive to said program-controlled equipment for effecting secure retention of said filament-length portions by the collection devices at which such filament-length portions are disposed.

13. A method of producing an article having a sheet which bears many lengths of optical filament, an end of each length of filament being inserted in the sheet at a selected position so that many inserted filament ends are available to form multiple display patterns of concurrently illuminated filament ends, said method including the steps of:
  i. inserting an end of a filament length extending from a filament supply into a sheet at a selected position on the sheet to constitute one element of one display pattern;
  ii. disposing a portion of said filament length at a selected collection location dedicated to one of said display patterns and severing the length of filament from the supply; and repeating said steps in cycles for inserting one end of each of many filament lengths into the sheet at positions constituting multiple patterns of inserted ends and, in the course of the repeated cycles, collecting portions of said filament lengths at selected collection locations so as to form groups of filament lengths, wherein each group includes only filament lengths of one pattern.

14. A method of producing an article as in claim 13, including, in each of said cycle of steps, the step of securing in place that portion of each filament length which is disposed at a selected collection location.

15. Apparatus for producing an article having a sheet bearing many lengths of optical filament, an end of each length of filament being inserted in the sheet so that the inserted ends form elements of one or more display patterns of many inserted ends, said apparatus including multiple filament-end insertion assemblies, each said assembly including a filament supply that provides a filament end for insertion into a sheet; a sheet support; an array of filament collection devices which are correspondingly dedicated to said display patterns; filament cutting means; and program-controlled equipment (1) for activating said filament-end insertion assemblies to concurrently insert multiple filament ends into a sheet carried by said sheet support so that lengths of filament extend from said filament-end insertion assemblies to filament ends inserted in said sheet, said inserted ends constituting elements of a display pattern or patterns; (2) for activating said cutting means to cut each length of filament from its filament supply, leaving each filament supply with a filament end for insertion into a sheet; and (3) for distributing said lengths of filament to those collection devices that are dedicated to said patterns.

16. Apparatus as in claim 15, including means for causing each length of filament that has been distributed to a collection device to be retained by such collection device.

* * * * *